US006999196B2

(12) United States Patent
Ishida

(10) Patent No.: US 6,999,196 B2
(45) Date of Patent: Feb. 14, 2006

(54) COLOR IMAGE FORMING APPARATUS

(75) Inventor: Haruhiko Ishida, Tokyo (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 236 days.

(21) Appl. No.: 10/739,171

(22) Filed: Dec. 19, 2003

(65) Prior Publication Data

US 2004/0131395 A1 Jul. 8, 2004

Related U.S. Application Data

(63) Continuation of application No. 09/522,897, filed on Mar. 10, 2000, now Pat. No. 6,690,483.

(51) Int. Cl.
*G06F 3/12* (2006.01)
*G06F 13/00* (2006.01)

(52) U.S. Cl. ........................................ 358/1.4; 358/1.6

(58) Field of Classification Search ................. 358/1.4, 358/1.6, 1.7, 1.8; 355/403, 47–51, 74, 88, 355/90; 399/6, 7, 27, 40, 47, 48; 271/3.21, 271/37, 38

See application file for complete search history.

(56) References Cited

U.S. PATENT DOCUMENTS

| | | | | |
|---|---|---|---|---|
| 5,087,945 A | | 2/1992 | Randall | |
| 5,600,429 A | * | 2/1997 | Kutsuwada | 399/17 |
| 6,155,726 A | * | 12/2000 | Ishikawa et al. | 396/575 |

* cited by examiner

*Primary Examiner*—Douglas Q. Tran
(74) *Attorney, Agent, or Firm*—Foley & Lardner LLP

(57) ABSTRACT

The color image forming apparatus (1) of the present invention has two intermediate transfer media. With at least two of color images (Y+M+C+K) layered previously, the other remaining images are further layered thereon by a between-intermediate-transfer-media transfer device, and a color image is formed on a transfer material by a transfer material transfer device. The time required until the color image is outputted is shortened. Particularly, an image of single black can be outputted in a shortest time in image formation.

20 Claims, 4 Drawing Sheets

COLOR IMAGE FORMING APPARATUS

The present application is a continuation of U.S. application Ser. No. 09/522,897, filed Mar. 10, 2000 now U.S. Pat. No. 6,690,483, the entire contents of which are incorporated herein by reference.

BACKGROUND OF THE INVENTION

The present invention relates to a color image forming apparatus represented by a color electronic copying machine, a color printer and the like using an electrophotographic method, which layers single-color images to form a color image.

U.S. Pat. No. 5,087,945 discloses an image forming apparatus which includes four image forming sections and two transfer drums. Color-component images formed by the four image forming sections are layered and outputted to a transfer material by one of the transfer drums.

In the image forming section apparatus disclosed in this U.S. Patent, a first image is formed on one transfer drum. A second image is formed on the same transfer drum at a timing at which the first image is conveyed by rotation of the transfer drum, and thus, first and second images are layered. The layered images are transferred to the other transfer drum. Thereafter, third and fourth images are sequentially formed thereon at timings at which the layered images are conveyed by rotation of the transfer drum, thereby to layer the images on the same transfer drum.

In the image forming apparatus described above, duet to the directions in which two intermediate transfer drums 5 are rotated and the feature of the layout of four image forming units 1 to 4 faced to the drums, for example, an image formed by the first image forming unit 1 is turned once on an intermediate transfer drum 5 which rotates in the clockwise direction, and is thereafter turned substantially three or four times on an intermediate transfer drum 5 which rotates in the anticlockwise direction. The image is then conveyed to a transfer position faced to the roller 7. Therefore, there is a problem that the time until images of four colors are layered and form one color image is elongated.

In addition, since the position of the image forming unit for forming a black (monochrome) image is node clearly defined, there is also a problem that the first copy time required until image formation of the first image after an instruction of the image formation is elongated.

The length of the first copy time is equal both in the case of forming a black image of single color and the case of forming a color image by layering four color images. Particularly when forming one sheet of single black image, the waiting time is long.

In addition, from another proposal not shown in the figures, four photosensitive drums are provided as image carriers in many color image forming apparatuses, and a charger, an exposure device, a developing device, a transfer device, a cleaning device, and a discharger are provided orderly around each of the photosensitive drums. Each of the first to fourth image forming units for forming predetermined colors is constructed by those devices provided along the circumference of the photosensitive drum.

The first to fourth image forming units are a set of total four units, i.e., an image forming unit for yellow, an image forming unit for magenta, an image forming unit for cyan, and an image forming unit for black.

In each of the first to fourth image forming units, a well-known electrostatic photographic process in the order of charge, exposure, development, transfer, cleaning, to discharge is carried out on the surface of the photosensitive drum. Meanwhile, a paper sheet as a transfer material is let pass through the units sequentially, so visible images of predetermined (four) colors formed by the image forming units are transferred one after another. Further, the images of multiple colors are fixed finally by a fixing device not shown which is provided next to the fourth image forming unit.

In this kind of color image forming apparatus, toner images in four colors formed by four image forming units are sequentially layered in case of forming an image of a predetermined color. Also, in this kind of color image forming apparatus, images are superposed at most four times.

Further another proposal for a well-known color image forming apparatus shows a method as follows. Toner images formed by four toner image forming sections for forming images of three colors respectively corresponding to the color components of subtractive primaries and a black image for strengthening the black density are formed on a belt-like photosensitive surface for every color, and are layered on an intermediate transfer drum. Thereafter, images of four colors are transferred onto a paper sheet by a transfer device.

However, in the color image forming apparatus of this kind, the total length of the intermediate drum is set to the maximum length of the image to be printed out, so there is a problem that the diameter is increased.

BRIEF SUMMARY OF THE INVENTION

The object of the present invention is to provide a high-speed color image forming apparatus which is capable of time required for image formation when forming a color image by layering a plurality of toner images and particularly capable of reducing time required for copying in single black color.

The present invention has been made in view of the problems described above and provides an image forming apparatus for forming four charged toner images, comprising: four toner image forming sections; first and second intermediate transfer members; four transfer devices for transferring four toner images formed by the four toner image forming sections to the first and second intermediate transfer members; a between-intermediate-transfer-member transfer member for transferring the four toner images transferred to the first and second intermediate transfer members, between the first and second intermediate transfer members; and an output transfer device for transferring, onto an output transfer material by the between-intermediate-transfer-members transfer member, a toner image obtained by layering and transferring a toner image, which is obtained by positioning and transferring one or several of the toner images formed by a corresponding number of the toner image forming sections to the first intermediate transfer member, onto a toner image, which is obtained by positioning and transferring one or several of the toner images formed by a corresponding number of the toner image forming sections to the second intermediate transfer member, wherein, where FP1 is a position at which the four toner images on the between-intermediate-transfer-members transfer member are transferred to the output transfer material, FP2 is a transfer position most distant from the FP1 among positions on the first and second intermediate transfer members at which the toner images are transferred from the toner image forming sections, a length of a course distance between the FP1 and FP2 is $L=|FP1-FP2|$, and a circumferential length of an image carrier is PL, $1.48<|FP1-FP2|/PL<2.25$ is satisfied.

Also, the present invention provides a color image forming apparatus comprising: n sets of toner image forming sections for forming charged toner images of plural colors; two intermediate transfer members; a transfer device for transferring a plurality of charged toner images formed by the toner image forming sections, to the intermediate transfer members; a between-intermediate-transfer-members transfer member for transferring the toner images transferred to the intermediate transfer members, between the intermediate transfer members; a second transfer device for transferring, to the between-intermediate-transfer-members transfer member, a toner image from the toner image forming section, which has been transferred to at least one of the intermediate transfer members; a detection device provided near each of the intermediate transfer members and the between-intermediate-transfer-members transfer member, for detecting a position of each of toner images transferred to the intermediate transfer members and the between-intermediate-transfer-members transfer member; a toner image position adjustment device for adjusting positions of the toner images; and a transfer material transfer device for transferring a toner image transferred to the between-intermediate-transfer-members transfer member or the second intermediate transfer member, to an output medium, wherein, if each of the intermediate transfer members corresponds to two or more of the toner image forming sections, relative positions of two or more toner images which are formed by the transfer devices on the first or second intermediate transfer member and which should be positionally aligned with each other in a first step are detected, and the position of the toner image formed by the toner image forming section is adjusted by the toner image position adjustment device, such that a difference caused between the relative positions is minimized on the first or second intermediate transfer member, as a first step, and relative positions of two superposed toner images which are transferred to the second intermediate transfer member by the between-intermediate-transfer-members transfer device and which should be positionally aligned with each other are detected by the detection device, the positions of the toner images formed on the second intermediate transfer member by the toner image forming sections are adjusted by the toner image position adjustment device, such that a difference between the relative positions of the superposed toner images is minimized, and a toner images obtained by superposing all of the toner images is transferred to an output transfer material by the transfer member transfer device.

Further, the present invention provides another color image forming apparatus comprising: four toner image forming sections for forming images of three colors respectively corresponding to color components of subtractive primaries and a black image for strengthening a black density; first and second intermediate transfer media to which two of four images of single colors formed by the four toner image forming sections are transferred; four first transfer devices for transferring the images of single colors respectively formed by the image forming sections to the first and second intermediate transfer members; a third intermediate transfer medium for layering images, which are respectively on the first and second intermediate transfer media and are each obtained by layering two of the images of single colors transferred by the four first transfer devices; two second transfer devices for transferring the images layered by the third first and second intermediate transfer media, to the third transfer medium; and a third transfer device for transferring a color image thus layered on the third intermediate transfer medium, to an output transfer material.

DETAILED DESCRIPTION OF THE INVENTION

In the following, a color image forming apparatus as an embodiment of the present invention will be explained specifically with reference to the drawings.

Figure 1:
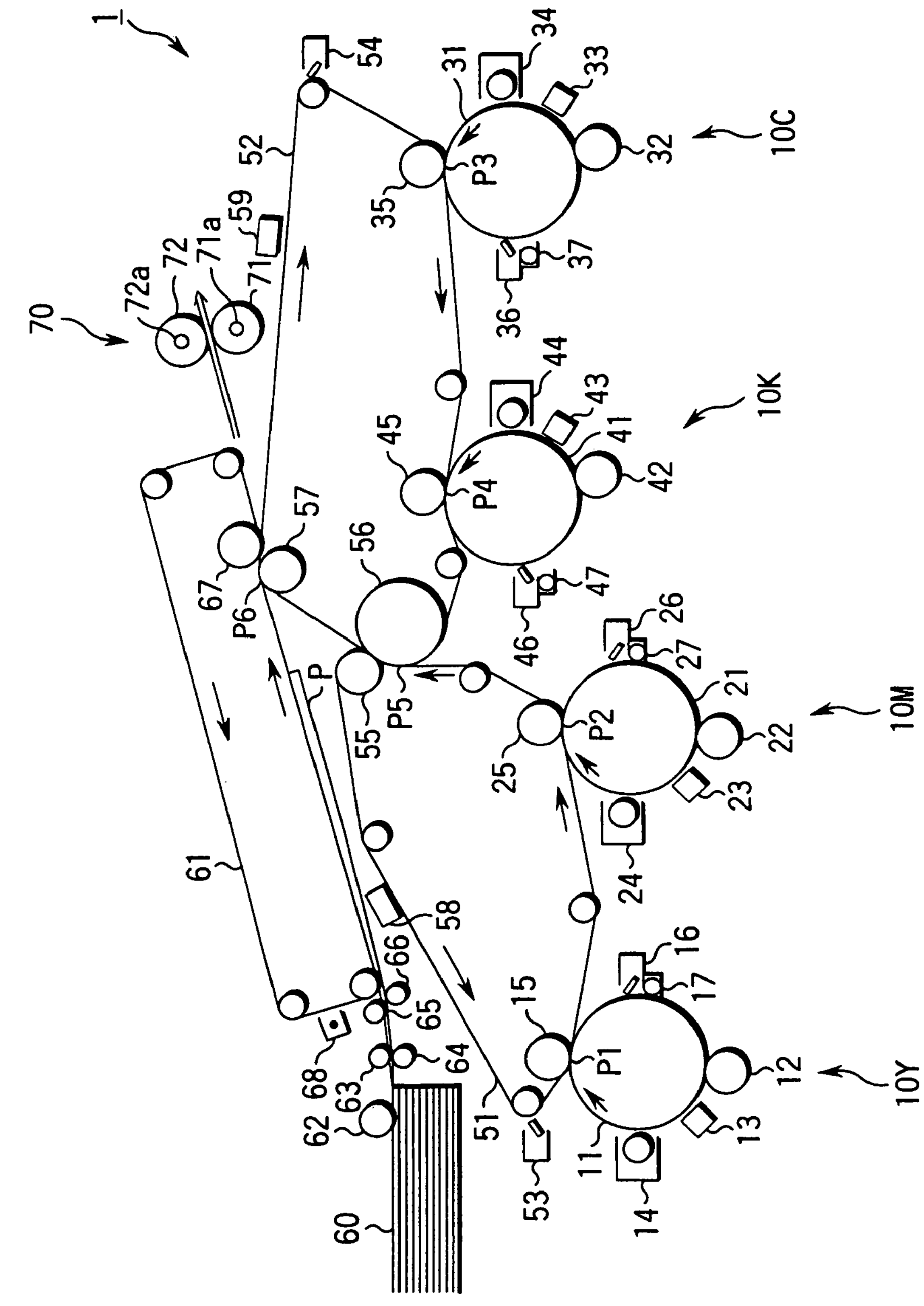
FIG. 1 is a schematic view showing a first embodiment of a color image forming apparatus according to the present invention.

FIG. 1 is a schematic view for explaining a color image forming apparatus using an electrophotographic process.

As shown in FIG. 1, the color image forming apparatus 1 has four toner image forming sections 10Y, 10M, 10C, and 10K for forming toner images of three colors corresponding to the color components of subtractive primaries and a black toner image for strengthening the black density. Since the toner image forming sections have substantially the same structure as each other except that the colors of toner used for visualizing electrostatic latent images are different, reiterative explanation of these sections will be avoided except for particular cases.

The toner image forming section 10Y is an image carrier and has a photosensitive drum 11 rotatable in the arrow direction. The photosensitive drum 11 is a cylindrical member made of aluminum which has a diameter of about 30 mm. An organic photoconductive layer having thickness of about 20 $\mu$m is provided on the surface of the photosensitive drum 11.

Around the photosensitive drum 11, the following devices are provided along the rotating direction.

A roller charger 12 for charging uniformly the photosensitive drum 11 to a predetermined negative potential is provided in contact with the surface of the photosensitive drum 11.

In the downstream side of the charger 12 in the drum rotating direction, there is provided an exposure device 13 for creating an electrostatic latent image by selectively charging the contrast in accordance with image information thereby to charge the electric charges on the photosensitive drum 11 previously electrified, in accordance with image information. In this example, the exposure device is a line LED exposure device including a predetermined number of very small LEDs capable of creating a latent image at a fine pitch of about 1200 (dpi).

In the downstream side of the exposure device 13 in the drum rotating direction, there is provided a two-component developing device 14 which supplies a developer to the electrostatic latent image formed on the photosensitive drum 11, to inversely develop the electrostatic latent image.

In the downstream side of the developing device 14 in the drum rotating direction, there is provided a first intermediate transfer medium 51 faced to the drum.

The first intermediate transfer medium 51 is an endless belt made from polyimide resin mixed with carbon. This belt 51 has average thickness of 100 $\mu$m and a total length of 255 mm.

The belt 51 contacts the photosensitive drum 11 with a predetermined pressure, so the belt 11 is bent within an area along the outer shape of the photosensitive drum 11. This area is called a contact nip. At this contact nip, a first transfer device 15 is provided in the back surface side of the belt 51 (in the side opposite to the photosensitive drum 11).

The first transfer device 15 is a roller-type transfer device which is rotated as a slave to the belt 51. The transfer roller 15 is made of, for example, urethane rubber and is an elastic roller which shows a semiconducting characteristic where the electric resistivity is decreased to about $10^{10}$ Ω·cm by mixing carbon grains therein.

In the downstream side of the photosensitive drum in the rotating direction, there are provided a cleaning device which has a blade made of urethane rubber or the like and removes toner remaining on the surface of the photosensitive drum 11, and a discharger 17 which has a lamp for radiating light of a predetermined wavelength and radiates light to discharge the electric potential remaining on the photosensitive drum 11.

The cleaning device 16 presses a blade member provided at an opening portion against the surface of the photosensitive drum 11 with a predetermined pressure, thereby to scrape off the toner remaining on the surface of the photosensitive drum 11. Note that the toner thus scraped off is collected into a toner collection device not shown and is discarded every time the collected toner reaches a predetermined amount. The residual electric potential which still remains after the toner is removed by the cleaning device 16 is discharged by discharge light which is irradiated onto the surface of the photosensitive drum 11 from the discharger 17.

Thus, the charger 12, exposure device 13, developing device 14, transfer device 15, cleaning device 16, and discharger 17 are provided in consecutive order along the direction in which the drum 11 is rotated, around the photosensitive drum 11, and construct a toner image forming section capable of forming a toner image of a predetermined one of the colors respectively corresponding to the color components used for subtractive primaries.

Needless to say, toner image forming sections capable of forming toner images of the other colors used for the subtractive primaries are respectively provided around the photosensitive drums 21, 31, and 41, likewise.

Subsequently, in the first exposure device 13, an electrostatic latent image (mirror image) is formed on the photosensitive drum 11 by supplying an electric signal corresponding to an image to be outputted. This electrostatic latent image is visualized (developed) to obtain a Y toner image (mirror image) by supplying Y toner as fine grains electrified by the developing device 14.

The Y toner image on the photosensitive drum 111 is conveyed, by rotation of the photosensitive drum 11, to a transfer portion P1 which is a contact nip where the photosensitive drum 11 and the intermediate transfer belt 51 contact each other.

The Y toner image conveyed to the contact nip which is the transfer portion P1 is applied with a predetermined voltage from the back side of the intermediate transfer medium 51 by the transfer roller (roller transfer device) 15 and is thereby transferred to the intermediate transfer medium 51 from the photosensitive drum 11 which is grounded in the base disk side. The transfer bias voltage applied to the back surface of the intermediate transfer medium 51 from the transfer roller 15 is substantially 1000V.

The belt 51 to which the Y toner image has been transferred is rotated by a drive source and a drive transmission mechanism which are not shown and is moved toward the contact nip faced to the second photosensitive drum 21.

Around the photosensitive drum 21, a charger 22, an exposing device 23, a developing device 24, a transfer device 25, a cleaning device 26, and a discharger 27 are provided in consecutive order along the direction in which the drum 21 is rotated, like the photosensitive drum 11.

Subsequently, like in the image forming process in the first photosensitive drum 11, a M latent image is formed by the exposure device 23 and is developed by magenta (M) toner. At a transfer position P2, a second transfer roller 25 applied with a predetermined voltage is pressed (against the belt 51) from the back side of the intermediate transfer medium 51 at a predetermined pressure, so the M toner image is layered on the Y toner image on the intermediate transfer medium 51 to which the Y toner image has already been transferred, with a positional offset from the Y toner image kept minimized, and is thus transferred to the intermediate transfer medium 51.

Thus, an M toner image is layered and transferred onto the intermediate transfer medium 51 to which the first Y toner image has been transferred, with the position of the M toner image aligned with the Y toner image. In this manner, a Y+M toner image in which the M toner image is layered on the Y toner image is formed. The Y+M toner image is a positive image having the same positional relationship as that after an image is transferred to an output transfer material. Also, the transfer bias voltage applied to the back surface of the intermediate transfer medium 51 from the transfer roller 25 is substantially 1000V like in the case of the first transfer roller 15.

Also, around the third photosensitive drum 31, a charger 32, an exposing device 33, a developing device 34, a transfer device 35, a cleaning device 36, and a discharger 37 are provided in consecutive order along the direction in which the drum 31 is rotated. By this third photosensitive drum 31, a cyan (C) toner image is developed, like the first and second photosensitive drums 11 and 21 previously explained.

The C toner image formed on the third photosensitive drum 31 is transferred to a second intermediate transfer medium 52 at a transfer position P3.

The method of transferring the C toner image to the intermediate transfer medium 52 is substantially the same as the method for toner image formation and transfer to an intermediate transfer medium taken by the first and second photosensitive drums 11 and 21. That is, a transfer roller 35 applied with a predetermined voltage is pressed from the back side of the intermediate transfer medium 52, and the C toner image formed on the third photosensitive drum 31 is transferred to the intermediate transfer medium 52. Note that the transfer bias voltage applied to the back surface of the intermediate transfer medium 52 from the transfer roller 35 is substantially 1000V. Although the intermediate transfer medium 52 is constructed in the same structure as the first intermediate transfer medium 51, the medium 52 has a circumferential length greater than the first intermediate transfer medium 51, e.g., 295 mm.

Also, around the fourth photosensitive drum 41, a charger 42, an exposing device 43, a developing device 44, a transfer device 45, a cleaning device 46, and a discharger 47 are provided in consecutive order along the direction in which the drum 41 is rotated. A K toner image is formed like the first to third photosensitive drums 11 and 31 previously explained.

The K toner image formed on the fourth photosensitive drum 41 is transferred to the second intermediate transfer medium 52, at a transfer position P4, like the third C toner image. At this time, the transfer roller 45 applied with a voltage is pressed from the back side of the intermediate transfer medium 52, and the K toner image is thereby transferred to the intermediate transfer medium 52 such that the K toner image is layered on the C toner image on the intermediate transfer medium 51.

Thus, the K toner image is superimposed and transferred onto the intermediate transfer medium 52 to which the third C toner image has been transferred. This image is called a C+K toner image. Also, the C+K image is a mirror image. The transfer bias voltage applied to the back surface of the intermediate transfer medium 52 from the transfer roller 45 is substantially 1000V.

Subsequently, the image (Y+M toner image) layered and transferred onto the intermediate transfer medium 51 is transferred to the second intermediate transfer medium 52 by a transfer area P5 defined as an area where, for example, between-transfer-media transfer devices 55 and 56 as two rollers are faced to each other. As a result, a final color image (Y+M+C+K) which is a mirror image is formed on the second intermediate transfer medium 52.

The intermediate transfer media 51 and 52 are rotated such that the moving directions of both media are the same as each other at the transfer area P5. Also, the intermediate transfer medium 52 is applied with a predetermined bias voltage such that a potential difference of 1000V is substantially created from the voltage which the intermediate transfer medium 51 keeps (i.e., the voltage of the medium 52 is 1000V higher than the voltage of medium 51). Note that the between-intermediate-transfer-media transfer devices 55 and 56 also serve to tension the first and second intermediate transfer media 51 and 52. In addition, the transfer medium in the side to which toner images previously layered are transferred (i.e., in the side including a toner image onto which another toner image is layered), e.g., the transfer device 56 in the side of the second intermediate transfer medium 52 in this example utilizes a roller member having a relatively larger diameter than that of the transfer device 55 in the side of the first intermediate transfer medium 51. Note that the between-intermediate-transfer-media transfer device 55 has substantially the same structure as the transfer device (transfer roller) 15 explained previously. Also, the between-intermediate-transfer-media transfer device 56 has substantially the same structure as the first transfer roller 15, except for the diameter.

The second intermediate transfer medium 52 is formed to be able to contact a transfer material P (which is a sheet-like transfer material and is normally a paper) conveyed from a transfer material supply mechanism (cassette) 60 by a conveyer belt 61. Hence, the color image transferred to the second intermediate transfer medium 52 is further transferred by a pair of material transfer devices 57 and 67 to the paper sheet P conveyed by the conveyer belt 61. The material transfer device 57 also serves as a tension to support the second intermediate transfer medium 52. Also, the material transfer device 67 is provided at a predetermined position in the inner circumferential side of the conveyer belt 61, such that a predetermined pressure is supplied to the material transfer device 57 at a position where the conveyer belt 61 which conveys the paper sheet P contacts the material transfer device 57.

Note that the material transfer devices 57 and 67 each have substantially the same structure as the transfer device 15 (transfer roller) explained previously and are, for example, rollers made of aluminum and having a diameter of 9 mm.

Next, the transfer step described above will be explained in more details. Reiterative explanation of the operation common to the first to fourth toner image forming sections will be avoided except for some parts.

The outer circumferential surface of the photosensitive drum 11 is moved at a speed of 50 mm/sec ($V_0$) by a drive motor not shown (i.e., the photosensitive drum 11 is rotated at a constant speed).

The photosensitive drum 11 is charged to, for example, a surface potential of about −500V by a charge roller 13 made of urethane and having a semiconducting characteristic. Note that the charge roller 13 is connected with a charge voltage power source not shown and is applied with −1050V, for example. Also, the charge roller 13 contacts the surface of the photosensitive drum 11 and is thereby rotated as a slave thereof.

The surface of the photosensitive drum 11 is made of photoconductor. As well known, photoconductor normally has a high resistance and has a characteristic that the resistivity decreases at a portion where light is irradiated when light is irradiated. Therefore, light corresponding to a printing pattern (image information to be outputted) is irradiated from the LED head 13 onto the surface of the photosensitive drum 11 previously charged, so a electrostatic latent image as a mirror image of output image information is formed on the surface of the photosensitive drum 11. Note that the electrostatic latent image is an image of an electric charge distribution which is formed on the surface of the photosensitive drum 11, i.e., a pattern of charges which is formed as the resistivity of the irradiated surface of the photosensitive drum 11 where light is irradiated by the LED head 13 decreases so that charges of the photosensitive drum 11 flow to the base layer side while charges of a part where light is not irradiated remain.

The photosensitive drum 11 onto which light from the LED head (exposure device) 13 has thus been irradiated at a predetermined exposure position on the photosensitive drum 11 previously charged to a predetermined potential thereby forming a latent image rotates at the speed $V_0$ to a developing position facing the developing device 14. That is, the electrostatic latent image is conveyed to the developing position by the rotation of the photosensitive drum 11.

The electrostatic latent image on the photosensitive drum 11 moved to the developing position is converted into a Y toner image (first toner image) as a visible image by the developing device 14.

The developing device 14 contains toner (Y toner) which contains pigment and is made of resin. The toner is agitated within the developing position 14 and is thereby frictionally electrified in the same polarity as that of the charges electrified on the photosensitive drum 11.

As the surface of the photosensitive drum 11 passes through the developing position facing the developing device 14, Y toner electrostatically sticks only to the part irradiated with light, i.e., the part of the latent image where the surface potential is eliminated because charges generated by charging flows to the base layer side of the drum 11.

The photosensitive drum 11 on which the Y toner image has been formed is rotated continuously at the circumferential speed $V_0$, and the image is transferred by the transfer roller 15 to the intermediate transfer medium 51 at the transfer position facing the transfer device 15. At this time, the visible image transferred to the belt 51 is a positive image.

Meanwhile, at a predetermined timing relative to the start of forming the first image in the first toner image forming section 10Y (e.g., the start of exposure), a M toner image is formed on the photosensitive drum 21 in the second toner image forming section 10M through the same step as in the first toner image forming section 10Y. Needless to say, this toner image is a mirror image which will be transferred onto the intermediate transfer medium 51 and then become a positive image.

When the Y toner image and the M toner image are layered on each other on the intermediate transfer medium 51, the positions of the toner images (Y+M) must be aligned precisely for the purpose of creating predetermined colors.

As a method for precisely layering the positions of two toner images will be, for example, there is a method of adjusting the timing at which light (image information) is irradiated from the LED head 13 or 23 for exposing image information to be outputted to the corresponding photosensitive drum (11 or 21).

The timing adjustment is achieved by detecting the Y toner image and M toner image by an image position detection sensor 58 provided at a predetermined position and by changing the timing at which the exposure device 13 or 23 exposes image information on the image forming unit 10Y or 10C (photosensitive drum 11 or 21), based on the detection, such that the toner images are situated at one same position on the intermediate transfer medium 51.

Although not shown in the figure, the sensor 58 has a reference light radiation section for radiating near infrared rays and a reflected-light detection section for detecting reflected light. The sensor 58 can distinguishes toner and the surface (back ground) of the intermediate transfer medium 51 from each other, due to the difference between the degree at which light is absorbed by toner grains (toner image) on the intermediate transfer medium 51 and the degree at which light is absorbed by the surface of the intermediate transfer medium 51. Note that the sensor 58 is constructed by, for example, an LED having an emission wavelength equivalent to near infrared rays and a photodetector having a peak of the light receiving sensitivity within a near infrared band.

The exposure timing is obtained on the basis of a result of detecting the width of a part (layered image) where line pattern images are experimentally prepared on the intermediate transfer medium 51. For example, two toner images (Y+M) which have an estimated value of line width of 100 $\mu$m after development are formed to be adjacent to each other, and the timing at which either the exposing device 13 or 23 outputs image information is adjusted such that the width of the part where both toner images overlap each other falls within ±20 $\mu$m. In this manner, the two toner images are layered within a tolerable range. In this example, the first toner image (Y) is used as a reference and the exposure position of the second toner image (M) is changed.

Thus, the Y toner image and the M toner image are layered precisely.

While the Y toner image and the M toner image are prepared, or in synchronization with the preparation or at a predetermined timing, a latent image (positive image) for a C image is formed at an exposure position on the third photosensitive drum 31 by the LED head 33. This latent image for the C image is conveyed at a speed $V_0$ to a development position facing the developing device 34. Toner is let stick thereto through a developing step and the latent image then becomes a C toner image (positive image).

The C toner image formed on the photosensitive drum 31 is conveyed to a transfer position facing the transfer roller 35 by the rotation of the photosensitive drum 31, and is transferred onto the intermediate transfer medium 52 by the transfer roller 35. At this time, the transferred C toner image becomes a mirror image.

Through a step to the step as described above, a K toner image is formed as a positive image on the photosensitive drum 41 and is transferred to the intermediate transfer medium 52.

Subsequently, by positioning similar to that previously explained in the case of layering Y and M toner images, the positions when C and K toner images are layered, i.e., the exposure timing by the exposure device is set, based on the output from the sensor 59 provided at a predetermined position. That is, the exposure timing of the K toner image is set in relation to the C toner image used as a reference.

Thus, the Y+M toner image layered on the first intermediate transfer medium 51 and the C+K toner image layered on the second intermediate transfer medium 52 are further layered on each other by the between-intermediate-transfer-media transfer devices 55 and 56, in a manner that the Y+M toner image is layered on the C+K toner image on the second intermediate transfer medium 52.

More specifically, by increasing the electric potential in the side of the second intermediate transfer medium 52 to be 1000V higher than the electric potential in the side of the first intermediate transfer medium 51 (i.e., by applying a predetermined transfer bias voltage to the second transfer medium 52), the Y+M toner image charged negatively on the intermediate transfer medium 51 is electrostatically attracted to the side of the second intermediate transfer medium 52, at the contact nip where the intermediate transfer media 51 and 52 contact each other.

At this time, using the position of the C+K toner image on the intermediate transfer medium 52 as a reference, a time lag for superposing the Y+M toner image in the side of the intermediate transfer medium 51 is adjusted by the timings of light irradiation from the LED heads 13(Y) and 23(M).

Finally, a line width of a layered image of four experimental patterns is detected and is adjusted so as to fall within a range of ±20 $\mu$m, with respect to a line width of 100 $\mu$m.

The above-described positioning operation for layering is carried out before the image forming apparatus 101 starts image forming operation (printing operation). Therefore, highly accurate layering is achieved.

In addition, setting can be arranged such that an adjustment pattern is generated between images even during image forming operation so that adjustment can be performed at any time.

Thus, a layered image (Y+M+C+K image) precisely positioned is formed on the intermediate transfer medium 52.

As has been explained above, a color image consisting of four toner images (Y, M, C, and K) is transferred to a transfer material (paper sheet) guided to a transfer position by the conveyer belt 61. Meanwhile, the paper sheet P is picked up from the cassette 60 and is conveyed toward the conveyer belt 61 by feed rollers 63 and 64. At this time, the inclination of the paper sheet P (to the conveying direction) which is caused during conveyance and when the paper sheet is picked out of the cassette is eliminated and is guided to a predetermined position of the conveyer belt 61.

The conveyer belt 61 is made of semiconducting urethane rubber having thickness of about 0.5 mm and is charged to a predetermined potential in a predetermined polarity. As a result, the paper sheet P fed from resist rollers 65 and 66 is electrostatically suctioned to and stands still on the surface of the conveyer belt 61 by an electrostatic force.

The circumferential speed of the conveyer belt 61 is set to be equal to the circumferential speed $V_0$ of each of the photosensitive drums 11, 21, 31, and 41 and the first and second intermediate transfer media 51 and 52.

The paper sheet P with a part thereof held by the resist rollers 65 and 66 is guided to a transfer portion P6 defined with respect to the intermediate transfer medium 52.

At the transfer portion P6, the transfer roller 67 (in the side of the conveyer belt) is applied with a voltage of +1000V by a power source not shown, and the transfer roller 57 (in the side of the second intermediate transfer medium) is maintained at a zero potential. Therefore, the color image of all toner (Y+M+C+K toner image) negatively charged on the intermediate transfer medium 52 is transferred to the paper sheet P.

Subsequently, after transferring the color image to the paper sheet P, toner remaining on the surfaces of the first and second intermediate transfer media 51 and 52 is cleaned therefrom by the cleaning devices 53 and 54 and is used for subsequent image formation.

Meanwhile, the paper sheet P to which a color image has been transferred is guided to a fixing device 70 to which a first roller 71 including a heater 71*a* and a second roller 72 including a heater 72*a* are faced under a predetermined pressure. The paper sheet P firmly holds a toner image since toner is melted at a fixing point as a part (nip portion) where both of the rollers are pressed in contact with each other. That is, the toner image is thermally fixed to the paper sheet P.

The transfer material P on which fixing has been completed is conveyed out onto a sheet discharge tray not shown.

Figure 2:
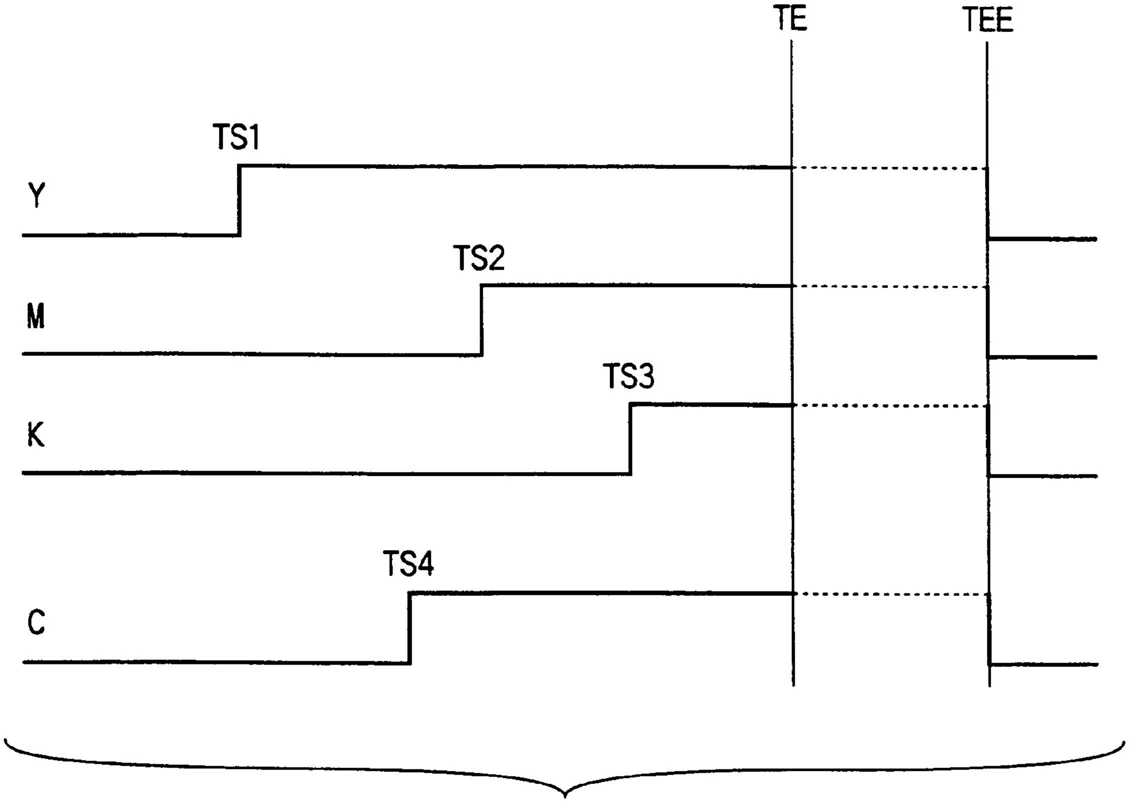
FIG. 2 is a timing chart which explains operation timings of respective parts of the color image forming apparatus shown in FIG. 1.

FIG. 2 is a timing chart which explains a time-based relationship between top end portions of images which are transferred and conveyed from the toner forming sections to the intermediate transfer media in the image forming process (image forming apparatus 101) described above.

In FIG. 2, TS1 indicates a time point at which the top end portion of a Y toner image on the rotating photosensitive drum 11 contacts the intermediate transfer medium 51. Likewise, TS2 indicates a time point at which the top end portion of a M toner image on the rotating photosensitive drum 21 contacts the intermediate transfer medium 51. The difference between TS1 and TS2 corresponds to a time period which the positions of the top end portions of these two images take to be equal to each other on the intermediate transfer medium 51.

TS3 indicates a time point at which the top end portion of a K toner image on the rotating photosensitive drum 31 contacts the intermediate transfer medium 52. TS4 indicates a time point at which the top end portion of a C toner image on the rotating photosensitive drum 41 contacts the intermediate transfer medium 52. Accordingly, the difference between TS3 and TS4 is a time period which the positions of the top end portions of these two images take to be equal to each other on the intermediate transfer medium 52.

As described previously, the positions of the toner images are aligned by using the sensors 58 and 59, so the positions of a Y+M toner image and a C+K toner image become equal at P5 indicated in FIG. 1. The time point TE corresponds to the P5. TEE indicates a time point when the top end portion of a completed color image reaches the transfer portion P6.

In this timing chart, operation of transferring the top end portion of the image of C toner to the intermediate transfer medium 52 is carried out before the time point TS2 at which the top end portion of the image of M toner is transferred to the intermediate transfer medium 51. That is, the transfer operations of transferring the top end portions of the respective toner images to the first and second intermediate transfer media 51 and 52 can be started simultaneously.

In the image forming apparatus shown in FIG. 1, the distance between the photosensitive drums 11 and 12 is about 75 mm. The distance from the transfer portion P1 where transfer to the intermediate transfer medium 51 or 52 is carried out earliest among toner images of four colors to the transfer portion P5 is about 113 mm. Also, the distance from P5 to the last transfer portion (transfer-material transfer portion) P6 is about 27 mm. Also, the distance L from P1 to P6 is about 140 mm. Supposing that the outer diameter PL of the photosensitive drum 11 (21, 31, and 41) is 30 mm, the outer circumferential length is substantially 94.2 mm. The ratio (L/P) between the distance L (about 140 mm) and PL is 1.485. This value (L/PL=1.485) can be regarded as the minimum interval at which two or more sets of toner image forming sections (each including a drum, a developing device, a cleaner, a charger, and the like) can be provided close to each other on the outer circumference of one intermediate transfer medium. If the minimum interval can be reduced, the amount of toner which can be contained in the developing device is reduced so that the number of sheets on which (or the number of times for which) images can be sequentially formed is reduced. Therefore, the interval between the toner image forming sections does not substantially become lower than the above value.

In contrast, in an image forming apparatus according to a well-known method in which four toner image forming sections are arranged in series, the distance corresponding to the L described above is about 75×3=225 mm. Accordingly, the time required until completion of color image formation can be reduced greatly in comparison with the conventional method.

In the image forming apparatus shown in FIG. 1, the cleaners 26 and 36 and the dischargers 36 and 37 of the second toner image forming section 10M and the fourth toner image forming section 10K are offset in the vertical direction, so the lengths of the two intermediate transfer media 51 and 52 are much more reduced, in comparison with a case where an image forming apparatus according to a well-known method in which four toner image forming sections are arranged in series is used, the image forming sections are divided at a boundary between the second and the third toner image forming sections, a first intermediate image is formed from the toner images prepared by the first and second toner image forming sections, a second intermediate image is formed from toner images prepared by the third and fourth toner image forming sections, and the two intermediate images are further layered. The distance between P5 where four toner images are layered and the last transfer position P6 can be much more reduced in comparison with the example in which a well-known image forming apparatus in which four toner image forming sections are arranged in series is divided into two parts as described above.

Thus, in the image forming apparatus shown in FIG. 1, the time required for forming a color image by layering four images can be reduced more than in a well-known image forming apparatus in which four toner image forming devices are arranged in series. In addition, the distance between the photosensitive drums 11 and 21 of the first and second toner image forming sections 10Y and 10M and the distance between the photosensitive drums 31 and 41 of the third and fourth toner image forming sections 10C and 10K are 75 mm each, and the distance from the position where the toner image formed by the toner image forming device which forms a toner image earliest is transferred to an intermediate transfer medium to the position where four toner images are layered is reduced to about 140 mm, so the entire size of the apparatus can be reduced.

In addition, the K toner image forming section 10K (photosensitive drum 41) is provided at the position closest to the last transfer section P6. Therefore, in case of forming only a K toner (monochrome) image, a transferred image can be outputted within a minimum time period after starting image forming operation. That is, it is possible to reduce the first copy time in monochrome image formation.

Figure 3:
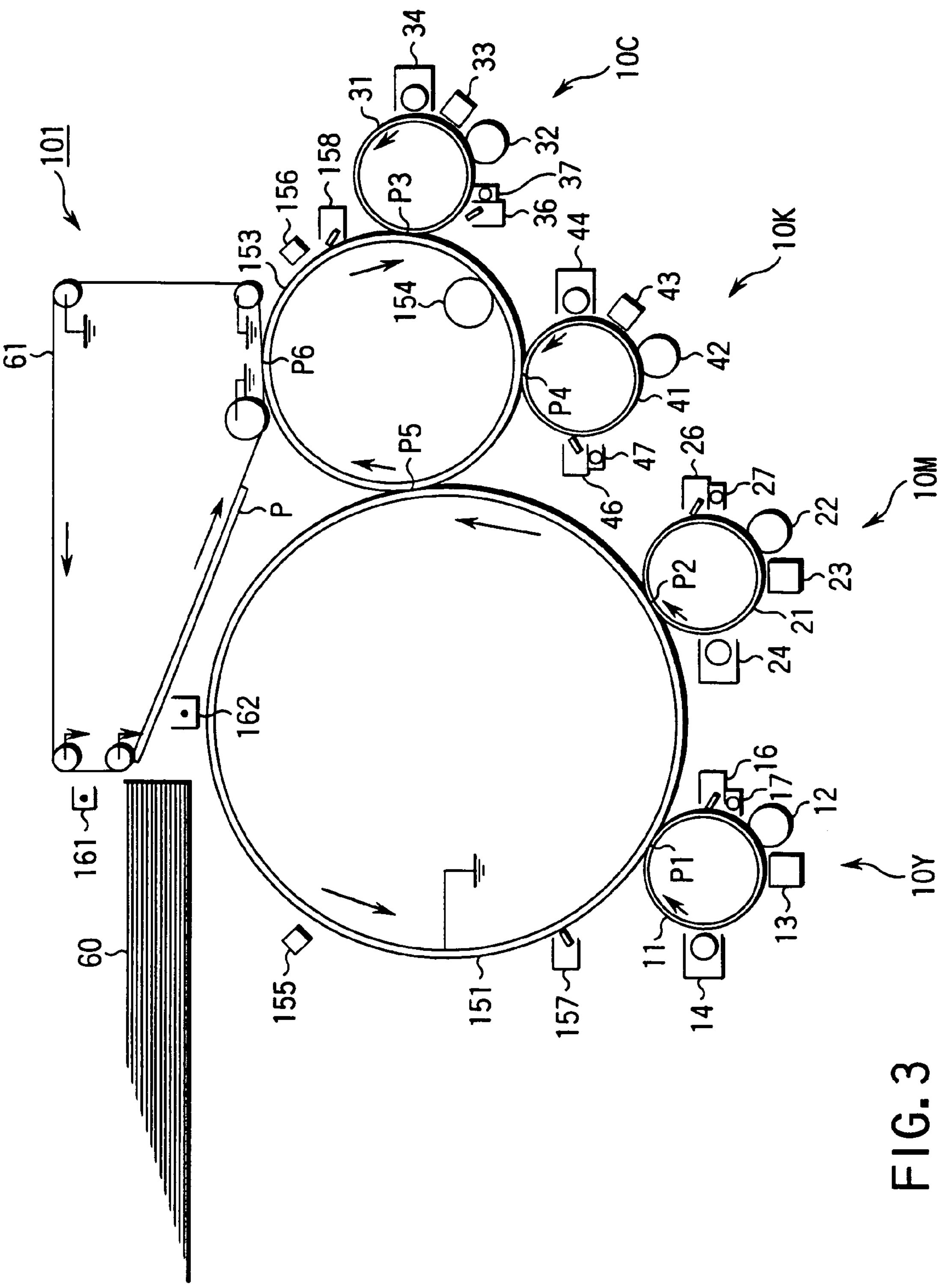
FIG. 3 is a schematic view showing an embodiment different from the color image forming apparatus shown in FIG. 1.

FIG. 3 is a schematic view which explains another embodiment different from the color image forming apparatus shown in FIG. 1. The same components of the structure as those of the structure shown in FIG. 1 will be denoted at the same reference symbols and detailed explanation thereof will be omitted herefrom.

The color image forming apparatus 101 shown in FIG. 3 uses drum-type intermediate transfer media in place of belt-type intermediate transfer media in the color image forming apparatus shown in FIG. 1. In the intermediate transfer medium 151, semiconductive rubber having a low resistance (which is made of urethane and is 1 mm thick) is adhered to the surface of an aluminum-made cylinder having a diameter of 117 mm.

In the photosensitive drum 11 of the first toner image forming section 10Y, organic photoconductor is coated on the base layer made of aluminum, and the potential of the aluminum-made base layer is maintained at −1000V by a power source not shown.

Through a normal electrophotographic process, a Y toner image (mirror image) is inversely developed on the photosensitive drum 11 rotating at a circumferential speed of 50 mm/sec ($V_0$) by a developing device 14. The Y toner image is grounded at the transfer portion P1, i.e., at 0V and is transferred to the intermediate transfer medium 151 maintaining a higher voltage compared with the potential of the photosensitive drum 11.

Likewise, a M toner image is formed by the second toner image forming section 10M and is transferred to the intermediate transfer medium 151 at the transfer portion P2. The base layer side of the photosensitive drum 21 is maintained at −1000V by a power source not shown.

In this manner, the Y and M images (positive images) are layered on the intermediate transfer medium 151.

The second intermediate transfer medium 153 has substantially the same structure as the intermediate transfer medium 151, and the diameter of the cylinder is set to 64 mm which is smaller than that of the intermediate transfer medium 151. At a predetermined position inside the intermediate transfer medium 153, a charge roller 154 made of aluminum and having a diameter of 9 mm is provided and is maintained at +1000V by a power source device not shown. Meanwhile, the base layer side of each of the photosensitive drums 31 and 41 of the third and fourth toner image forming sections 10C and 10K is maintained at 0V.

C and K toner images formed on the photosensitive drums 31 and 41 are layered on the intermediate transfer medium 153 and is layered and transferred as a C+K toner image (mirror image).

Since a potential difference of 1000V exists between the base layers of the intermediate transfer media 151 and 153, the Y+M toner image negatively charged can be overlapped on the C+K toner image formed on the second intermediate transfer medium 153 at the transfer portion P5.

The first and second sensors 155 and 156 are used for aligning the positions of the toner images as has been explained with reference to FIG. 1. In this manner, the positions of the four layered toner images are precisely aligned with each other with precision of ±20 $\mu$m.

From the sheet cassette 60, a recording paper sheet P is picked out by a pickup roller not shown and is conveyed to a resist roller not shown through a feed roller not shown.

The resist roller eliminates an inclination of the transfer material P to the conveying direction, which is caused during conveyance or when it is picked out of the cassette, and feeds the material P to the conveyer belt 61 made of semiconducting urethane rubber having thickness of about 0.5 mm.

The surface of the conveyer belt 61 is previously charged by a suction charger 161, so the paper sheet P is suctioned to the surface of the conveyer belt 61 by an electrostatic force.

The circumferential speed of the conveyer belt 61 is set to be equal to the circumferential speed $V_0$ of each of the photosensitive drums 11, 21, 31, and 41 and the first and second intermediate transfer media 151 and 153.

The transfer material P is fed to the transfer position P6 where the material P contacts the second intermediate transfer medium 153. The paper sheet P is subjected to corona charge by a charger 162 and is thereby charged to about +2000V which is 1000V higher than the potential of the intermediate transfer medium 153. Therefore, the Y+M+C+K image negatively charged on the intermediate transfer medium 153 is transferred to the transfer material P at the transfer portion P8.

Thus, the paper sheet P to which the image of four colors (Y+M+C+K) has been transferred is guided to a fixing device not shown, and the toner image is melted at a fixing point as a press contact portion (nip portion) between a heat roller incorporating a heater and a press roller pressed against the heat roller, so the toner image is fixed to the paper sheet P itself.

The transfer material P after completion of the fixing is conveyed out to a sheet discharge tray not shown by a feed-out roller not shown.

Meanwhile, the intermediate transfer media 151 and 153 are kept rotated on as they are, and are guided to the cleaning devices 157 and 158 where the surfaces of the media are cleaned.

In the image forming apparatus shown in FIG. 3, consideration is taken into the position P5 where all the toner images are layered, the transfer position P6 where the toner images layered at the P5 are transferred to a paper sheet, and the position where a toner image formed by a toner image forming section at a position most distant from the transfer position P6 is transferred to the first or second intermediate transfer medium 151 or 153. The distance from P1 to P5 is 132 mm and the distance between P5 and P6 is 54 mm, so the distance L from P1 to P6 is 186 mm. The ratio L/PL of this distance L to the outer circumferential length PL of each photosensitive drum is $186/30\pi=1.97$ where the diameter of each photosensitive drum is substantially 30 mm.

As is apparent from the above description, the time required for the first output is shortened in both of color output and black output which is used frequently in comparison with a well-known color image forming apparatus in which four sets of toner image forming devices are arranged in series. In addition, in the structure shown in FIG. 3, the diameter of the second intermediate transfer medium is optimized to output a black toner image in a short time, so the time required for the first output can be much more shortened, in comparison with the color image forming apparatus disclosed in U.S. Pat. No. 5,087,945 which has a similar structure.

Although the shapes of both the intermediate transfer media 151 and 153 are cylindrical in the present embodiment, one of the media may be of a belt type.

Figure 4:
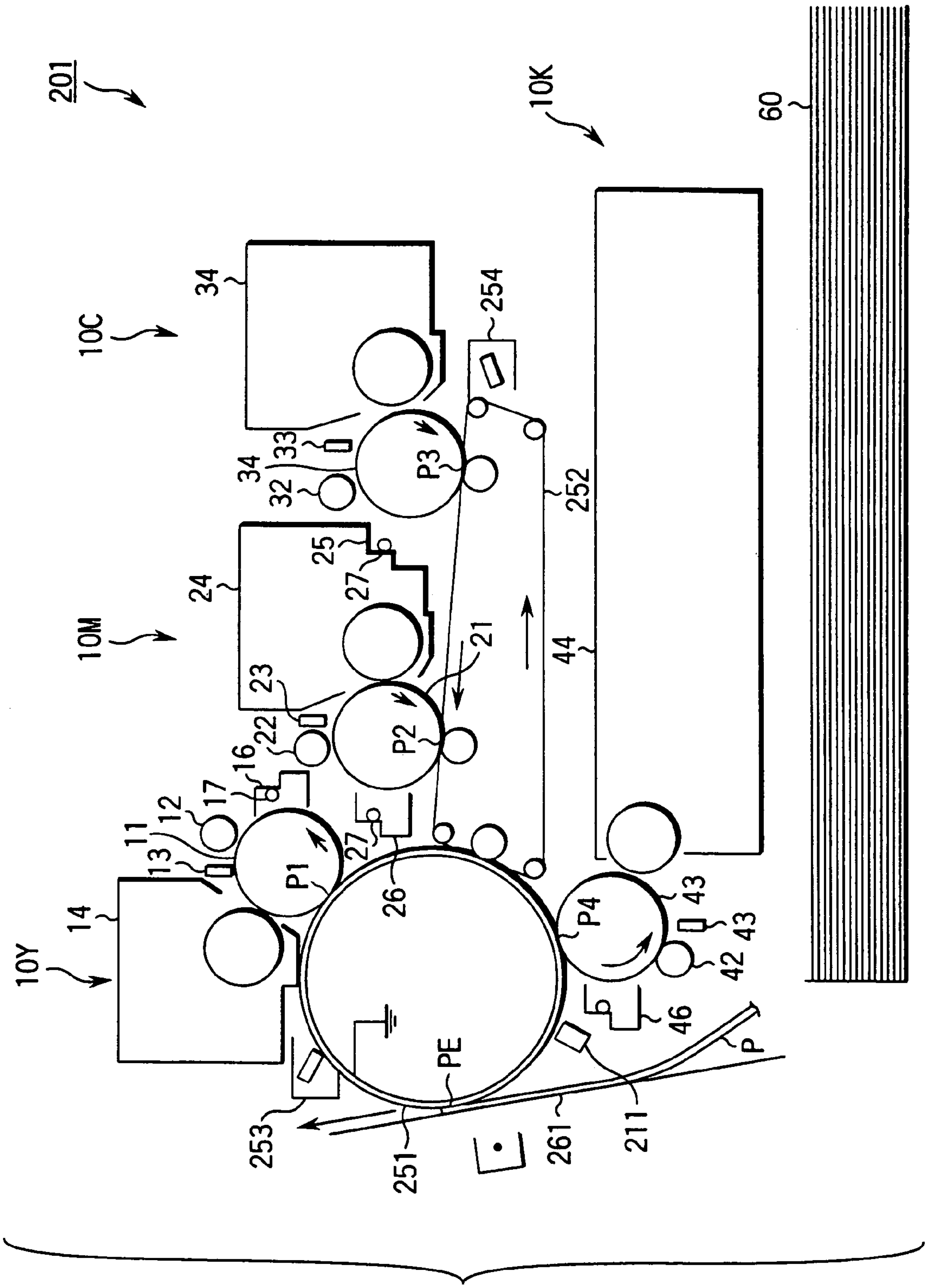
FIG. 4 is a schematic view showing further another embodiment of the color image forming apparatus shown in FIG. 1.

FIG. 4 is a schematic view showing further another embodiment of the present invention. The same components of the structure as those of the structures shown in FIGS. 1 and 3 will be denoted by the same reference symbols, and detailed explanation thereof will be omitted herefrom.

The color image forming apparatus 201 shown in FIG. 4 has first to fourth toner image forming sections 10Y, 10M, 10C, and 10K, a belt-like first intermediate transfer medium 251, and a drum-like second intermediate transfer medium 252. The K toner image forming section 10K is provided at the position closest to a last transfer section PE.

Also, a non-magnetic one-component developing method is adopted for the K toner image forming section 10K which is used frequently. Although a two-component developing method is adopted for the Y toner image forming section 10Y, M toner image forming section 10M, and C toner image forming section 10C, the one-component developing method may be adopted for these sections like the K toner image forming section 10K.

Meanwhile, the intermediate transfer media 251 and 252 are constructed in the same structures as those explained previously with reference to FIGS. 1 and 3. In addition, the exposure method may be of a type which performs scanning with a laser beam.

In this image forming apparatus 201, image formation is started earliest in the third toner image forming section 10C, and the image is transferred to the intermediate transfer medium 252 at the transfer position P3. Subsequently, a Y image is formed by the first toner image forming section 10Y and is transferred to the intermediate transfer medium 251 at the transfer position P1, and a M image is formed by the second toner image forming section 10M and is transferred to the intermediate transfer medium 252 at the transfer position P2. At last, a K image is formed by the K toner image forming section 10K and is transferred to the intermediate transfer medium 251 at the transfer position P4. At the transfer position P4, the K toner image is superposed with the M, Y, and C toner images layered in consecutive order, and the toner images are transferred to a paper sheet P conveyed on the belt 261, at the transfer position PE. Meanwhile, the intermediate transfer media 251 and 252 are kept rotated as they are and are guided to the cleaning devices 253 and 254 where the surfaces are cleaned, respectively.

Next explanation will be made of an example of a method for layering the positions of toner images in the color image forming apparatus 201.

At first, with an electric signal taken as a common reference, light is emitted simultaneously from the exposure devices 13, 23, 33, and 43, and an arbitrary test pattern is exposed to form latent images on the photosensitive drums 11, 21, 31, and 41 of the toner image forming sections, respectively.

The four test patterns (toner images) developed by the toner image forming sections 10Y, 10M, 10C, and 10k are transferred to the second intermediate transfer medium 251 at the transfer positions P2 and P3 or to the first intermediate transfer medium 251 at the transfer positions P1 and P4. As a result, the toner images pass through the sensor 211 in the order from the K toner image to M, Y, and C toner images with predetermined time lags inserted between each other.

The time lags of between these four toner images are calculated by a processing unit (CPU). Based on differences from the predetermined time lags, exposure timings at which the toner image forming sections respectively emit exposure light corresponding to an output image are adjusted, and then, the toner images of respective colors can be layered. In this case, the intervals between the test patterns are not always uniform, but the type of the sensor and the processing method are not limited as long as the intervals (time lags) between the test patterns can be detected.

If the sensor 211 is provided in the downstream side of the transfer position P4 where the K toner image is transferred to the first intermediate transfer medium 251 by the K toner image forming section 10K, it is possible to obtain time lag data between the patterns other than the C toner image pattern before the pattern which comes latest (e.g., the pattern formed by the C image forming unit 10C) passes through the sensor 211.

Where L/PL is obtained like in the image forming apparatus shown in FIG. 1, the distance to the transfer-material transfer portion PE at which images of four colors are transferred from the transfer portion P1 at which transfer to the intermediate transfer medium 251 or 252 is carried out earliest among the toner images of four colors is about 212 mm. If the outer diameter of each photosensitive drum is 30 mm, L/PL becomes 2.25. Therefore, in an image forming apparatus which layers four toner images to form a color image, a preferable range of the ratio L/PL of the distance L between the transfer portion FP1 at which transfer to an intermediate transfer medium is carried out earliest among toner images of four colors and the transfer-material transfer portion FP2 at which images of four colors are transferred to a transfer material to the outer circumferential length PL of the photosensitive drum is $1.48<L/PL<2.25$. L is a length expressed by $|FP1-FP2|$. In addition, if two or more toner image forming sections for forming toner images of four colors are provided for each toner image ($4n:2\leqq n$), $1.48(n/4)<L/PL<2.25(n/4)$ is satisfied.

Also, in the color image forming apparatus shown in FIG. 4, the first copy time is greatly reduced. Particularly in case of obtaining a single black image, this image forming apparatus is more advantageous in comparison with the color image forming apparatus having a similar structure disclosed in the U.S. Pat. No. 5,087,945.

As has been explained above, the image forming apparatus according to the present invention has at least two intermediate transfer media. With at least two of color (Y, M, C, and K) images previously layered, another remaining image is superposed and transferred. Therefore, it is possible to shorten the time required for a between-intermediate-transfer-media transfer device to layer images of four single colors to form a color image.

In addition, the K toner image forming section for forming a K toner image is provided at a position closest to the between-intermediate-transfer-media transfer device or immediately before the last transfer position where the toner images are transferred to a transfer material. Therefore, the time required until a single black color image is transferred to a paper sheet P becomes shortest, so the first copy time for single black (monochrome) image is reduced.

What is claimed is:

1. A color image forming apparatus comprising:

a first toner image forming section which forms a toner image of first color;

a second toner image forming section forming a toner image of second color different from the first color;

a first transfer member to which each of the toner images formed by the first and second toner forming sections is transferred;

a third toner image forming section which forms a toner image of third color different from each of the first color and the second color;

a fourth toner image forming section which forms a toner image of fourth color different from each of the first color, the second color, and the third color;

a second transfer member to which each of the toner images formed by the third and fourth toner image forming sections is transferred;

a first transfer device which transfers each of the toner images held by the first and second transfer members to the second transfer member so as to be superimposed thereon; and a second transfer device which transfers the toner image held on the second transfer member to a transferred object to which a toner image should be transferred.

2. A color image forming apparatus according to claim 1, further comprising:

a mechanism for conveying the transferred object to which a toner image should be transferred, which carries the transferred object held on a third transfer member so as to be superimposed thereon by the second transfer device at a first transfer position in which the second transfer device and the third transfer member are in contact.

3. A color image forming apparatus according to claim 2, wherein the mechanism for conveying the transferred object to which a toner image should be transferred and the third transfer member can be integrally used.

4. A color image forming apparatus according to claim 1, wherein a first transfer position in which the second transfer device and the second transfer member are in contact and second transfer positions in which each of the second transfer member and the first transfer member is in contact with the first to fourth toner image forming sections have the following relationship:

the first transfer position is a position at which the toner images of four colors are transferred to the transferred object, the second transfer position is a mono-color toner image transfer position most distant from the first transfer position among positions on the first and second transfer members at which the toner images are transferred from the toner image forming sections, a length, L, of a course distance between the first transfer position, FP1, and the second transfer position, FP2, is given by $L=|FP1-FP2|$, and a circumferential length, PL, of an image carrier is such that $1.48<|FP1-FP2|/PL<2.25$.

5. A color image forming apparatus according to claim 1, wherein one of the first and second transfer members is of a belt type.

6. An apparatus according to claim 1, wherein one of the four toner image forming sections which forms a black image is positioned closest to the second transfer device.

7. An apparatus according to claim 1, further comprising:

toner image position adjustment mechanisms respectively provided for the first and second transfer members, for respectively adjusting positions of the toner images transferred to the first and second transfer members; and toner image detection mechanisms respectively provided at predetermined positions near the first and second transfer members, for respectively detecting the positions of the toner images transferred to the first and second transfer members from the toner image forming sections, wherein if the toner images from two or more of the toner image forming sections are transferred to at least one of the first and second transfer members, timings at which the toner images from the toner image forming sections are transferred to the first or second transfer member are adjusted by the toner image position adjustment mechanisms, such that relative differences between the positions of the toner images are minimized, based on relative positions of the toner images on the first and second transfer members, detected by the toner image detection mechanisms, and if the toner image from the first transfer member is transferred to the second transfer member, a timing at which the toner image from the first transfer member is transferred to the second transfer member is adjusted by the toner image position adjustment mechanisms, such that a difference between the positions of the toner images is minimized, based on relative positions of the toner images on the second transfer member, detected by the toner image detection mechanisms.

8. An apparatus according to claim 7, wherein if the toner image from the first transfer member is transferred to the second transfer member in a case where the toner image from one of the toner image forming sections and the toner image from another one of the toner image forming sections are respectively transferred, a timing at which the toner image from the first transfer member is transferred to the second transfer member, such that a relative difference between the toner image is minimized, based on relative positions on the second transfer member, detected by the toner image detection mechanisms.

9. An apparatus according to claim 8, wherein the toner image position adjustment mechanism is a mechanism which adjusts an exposure timing of an exposure device which exposes image information corresponding to a toner image at the toner image forming section.

10. An apparatus according to claim 2, further comprising:

toner image position adjustment mechanisms respectively provided for the first and second transfer members, for respectively adjusting positions of the toner images transferred to the first and second transfer members; and toner image detection mechanisms respectively provided at predetermined positions near the first and second transfer members, for respectively detecting the positions of the toner images transferred to the first and second transfer members from the toner image forming section, wherein if the toner images from two or more of the toner image forming sections are transferred to at least one of the first and second transfer members, timings at which the toner images from the toner image forming sections are transferred to the first or second transfer member are adjusted by the toner image position adjustment mechanisms, such that relative differences between the positions of the toner images are minimized, based on relative positions of the toner images on the first and second transfer members, detected by the toner image detection mechanisms, and if the toner image from the first transfer member is transferred to the second transfer member, a timing at which the toner image from the first transfer member is transferred to the second transfer member is adjusted by the toner image position adjustment mechanisms, such that a difference between the positions of the toner images is minimized, based on relative positions of the toner images on the second transfer member, detected by the toner image detection mechanisms.

11. An apparatus according to claim 10, wherein if the toner image from the first transfer member is transferred to the second transfer member in a case where the toner image from one of the toner image forming sections and the toner image from another one of the toner image forming sections are respectively transferred, a timing at which the toner image from the first transfer member is transferred to the second transfer member, such that a relative difference between the toner image is minimized, based on relative positions on the second transfer member, detected by the toner image detection mechanisms.

12. An apparatus according to claim 11, wherein the toner image position adjustment mechanism is a mechanism which adjusts an exposure timing of an exposure device which exposes image information corresponding to a toner image at the toner image forming section.

13. A color image forming apparatus comprising:

a first toner image forming section which forms a toner image of first color;

a second toner image forming section forming a toner image of second color different from the first color;

a first transfer member to which each of the toner images formed by the first and second toner forming sections is transferred;

a third toner image forming section which forms a toner image of third color different from each of the first color and the second color;

a fourth toner image forming section which forms a toner image of fourth color different from each of the first color, the second color, and the third color;

a second transfer member to which each of the toner images formed by the third and fourth toner image forming sections is transferred;

a third transfer member to which the toner images held on the first and second transfer members are transferred so as so be interposed on each other and which holds the transferred toner images; and a transfer device which transfers the toner images held on the third transfer member to an object to which a toner image should be transferred.

14. A color image forming apparatus according to claim 7, characterized in that a fourth transfer member is capable of holding the object to which a toner image should be electrostatically transferred, allowing the first to fourth toner images superimposed on the third transfer member to be directly transferred to the object to which a toner image should be transferred.

15. A color image forming apparatus according to claim 7, wherein a first transfer position in which the third transfer member and a fourth transfer member are in contact and second transfer positions in which each of the second transfer member and the first transfer member is in contact with the first to fourth toner image forming sections have the following relationship:

the first transfer position is a position at which the four toner transfer members are transferred to the object, the second transfer position is a mono-color toner image transfer position most distant from the first transfer position among positions on the first and second transfer members at which the toner images are transferred from the toner image forming sections, a length, L, of a course distance between the first transfer position, FP1, and the second transfer position, FP2, is given by L=|FP1−FP2|, and a circumferential length, PL, of an image carrier is such that 1.48<|FP1−FP2|/PL<2.25.

16. A color image forming apparatus comprising:

a first toner image forming section which forms a toner image of first color;

a second toner image forming section forming a toner image of second color different from the first color;

a first transfer member to which each of the toner images formed by the first and second toner forming sections is transferred;

a third toner image forming section which forms a toner image of third color different from each of the first color and the second color;

a fourth toner image forming section which forms a toner image of fourth color different from each of the first color, the second color, and the third color;

a second transfer member to which the toner image of the first color and the toner image of the second color temporarily held by first transfer member are transferred between transfer positions to which the toner images formed by the third and fourth toner image forming sections are respectively transferred, and holding the toner image of the first color, the toner image of the second color, the toner image of the third color, and the toner image of the fourth color, such that they can be transferred to a transferred object to which the toner images should be transferred; and a transfer device which transfers the toner image held by the second transfer member to the transferred object to which the toner image should be transferred.

17. A color image forming apparatus according to claim 16, wherein a first transfer position is a position at which the four toner transfer members are transferred to the output transfer material, a second transfer position is a mono-color toner image transfer position most distant from the first transfer position among positions on the first and second transfer members at which the toner images are transferred from the toner image forming sections, a length, L, of a course distance between the first transfer position, FP1, and the second transfer position, FP2, is given by L=|FP1−FP2|, and a circumferential length, PL, of an image carrier is such that 1.48<|FP1−FP2|/PL<2.25.

18. A color image forming apparatus according to claim 16, wherein one of the first and second transfer members is of a belt type.

19. An apparatus according to claim 16, wherein one of the four toner image forming sections which forms a black image is positioned closest to the second transfer device.

20. A method of forming a color image comprising:

forming a toner image of first color by a first toner image forming section;

forming a toner image of second color different from the first color by a second toner image forming section;

forming a toner image of third color different from each of the first color and the second color by a third toner image forming section;

forming a toner image of fourth color different from each of the first color, the second color, and the third color by a fourth toner image forming section;

holding each of the toner images formed by the first and second toner image forming sections on a first transfer member;

holding each of the toner images formed by the third and fourth toner image forming sections in an upstream of a first transfer position with respect to a direction in which a toner image is carried, on a second transfer member which is in contact with the first transfer member in the first transfer position; and transferring the toner image of the first color and the toner image of the second color held on the first transfer member to the second transfer member so as to be superimposed on the toner image of the third color and the toner image of the fourth color held on the second transfer member.

* * * * *